UNITED STATES PATENT OFFICE.

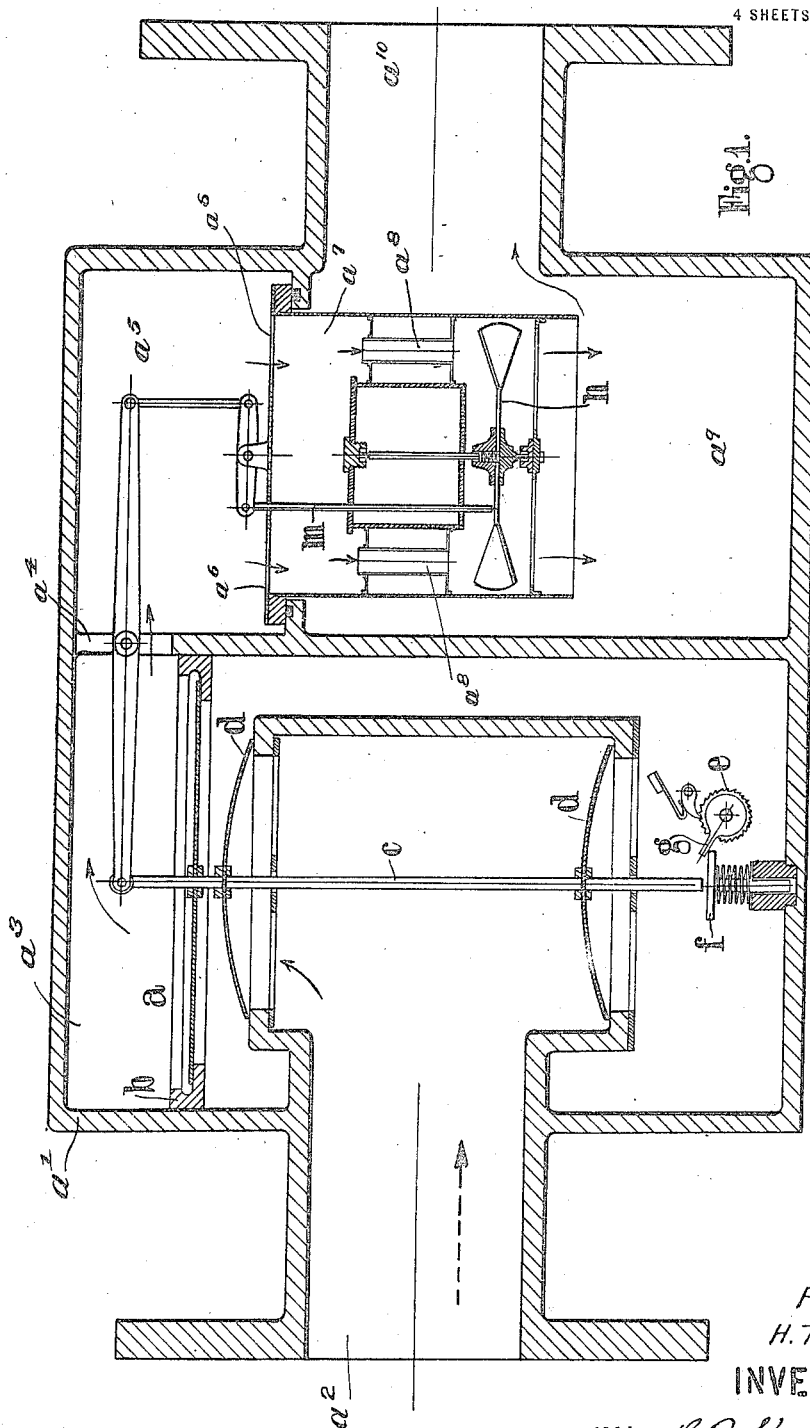

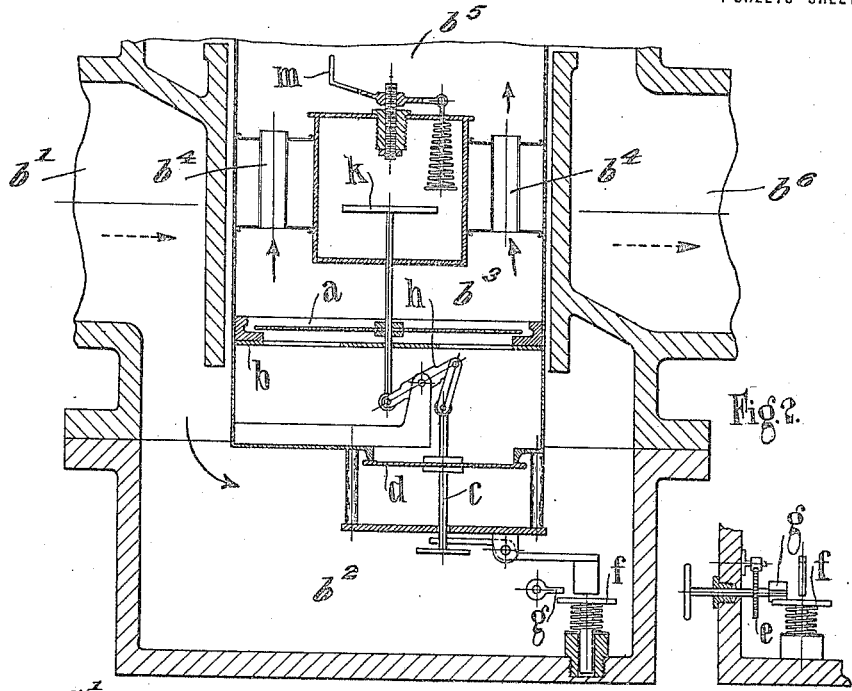

FRANKLIN THORP AND HARVEY THOMAS THORP, OF WHITEFIELD, ENGLAND.

GAS AND LIKE METER.

1,424,220.    Specification of Letters Patent.    Patented Aug. 1, 1922.

Application filed June 11, 1918. Serial No. 239,417.

*To all whom it may concern:*

Be it known that we, FRANKLIN THORP, of Grasmere, Whitefield, Lancashire, England, and HARVEY THOMAS THORP, of Ravensworth, Whitefield, Lancashire, England, subjects of the King of Great Britain and Ireland, have invented certain new and useful Improvements in Gas and like Meters, of which the following is a specification.

This invention relates to meters of the fan or rotor type, and has for its object to provide simple and efficient means for preventing the flow of gas through the meter when the rate of flow falls below a predetermined minimum which is the limit of the accurate registration by the meter of the volume of gas passing therethrough.

Our invention comprises the provision in the gasway or passage through the meter, of a disc-like part so connected with a meter control valve that when the flow of gas through said passage falls below a predetermined minimum, the said disc descends and causes the closing of the valve to cut off the gas supply, whilst when the rate of flow exceeds the minimum the said disc is raised and holds the control valve open or allows it to remain open.

Our invention further comprises the arrangement whereby the said disc also forms the control valve and is connected with a diaphragm by a stem forming a communicating passage between the inlet side of the valve and the outer side of the diaphragm for the purpose hereinafter described.

Referring to the four accompanying sheets of explanatory drawings:—

Figure 1 is a sectional elevation through a rotary meter showing one convenient method of applying our invention thereto. Certain parts of the metering mechanism are omitted.

Figures 2, 4, 5 and 6 illustrate portions of meters sufficient to show modified ways of applying the invention.

Figure 3 is a separate view illustrating a convenient mechanism for the initial opening of the gas control valve of the meter.

The same reference letters in the different views indicate the same or similar parts.

In the application of our invention illustrated at Figure 1, we arrange a disc-like element $a$ to be capable of free movement axially within a passage formed by the ring $b$ through which the gas to be measured by the meter passes. The area around the disc and between the latter and the ring $b$ for the travel of the gas is of such a restricted character that when the meter is passing the minimum quantity or more than the minimum quantity of gas for which the meter will register satisfactorily, the disc is supported independently of the ring $b$ by the gas flow. If the rate of flow falls below the minimum, the gas is unable to support the disc and the latter drops on to the ring $b$. The said disc $a$ is connected to the spindle $c$ of an equilibrium valve comprising two discs $d$ serving as a gas control valve for the meter. The parts aforesaid are so disposed that when the flow of gas through the meter is at or above the predetermined minimum rate for that meter, the disc $a$ is raised or sustained as aforesaid and holds the equilibrium valve $d$ open, but when the rate of flow falls below the minimum, the disc ceases to be sustained and allows or causes the closing of the control valve $d$.

The initial opening of the valve $d$ is effected by externally operated means. In the example, the ratchet wheel $e$ is operated from outside the meter casing and depresses a spring pressed element $f$. When the latter is released by the projection $g$ rigid with the ratchet wheel, it rises rapidly and opens the valve $d$ with a trigger-like action. The disc $a$ then maintains the valve open if the flow of gas is at or above the minimum, otherwise the disc and valve return to their out-of-service positions.

In operation fluid flows into the casing $a'$ through the inlet $a^2$ and when the valves $d$ and $a$ are opened, it passes upwardly as shown by the arrows into the upper portion of the chamber $a^3$. Then it flows through an opening $a^4$ into the chamber $a^5$. From the chamber $a^5$ the fluid flows downwardly through apertures $a^6$ into a rotor casing $a^7$. Then the fluid passes through tubes $a^8$, and the tubes direct the fluid onto the vanes of the rotor $n$ and this causes the rotor to revolve. After leaving the rotor the fluid passes downwardly into a chamber $a^9$ and then out through an outlet $a^{10}$.

Figure 4:
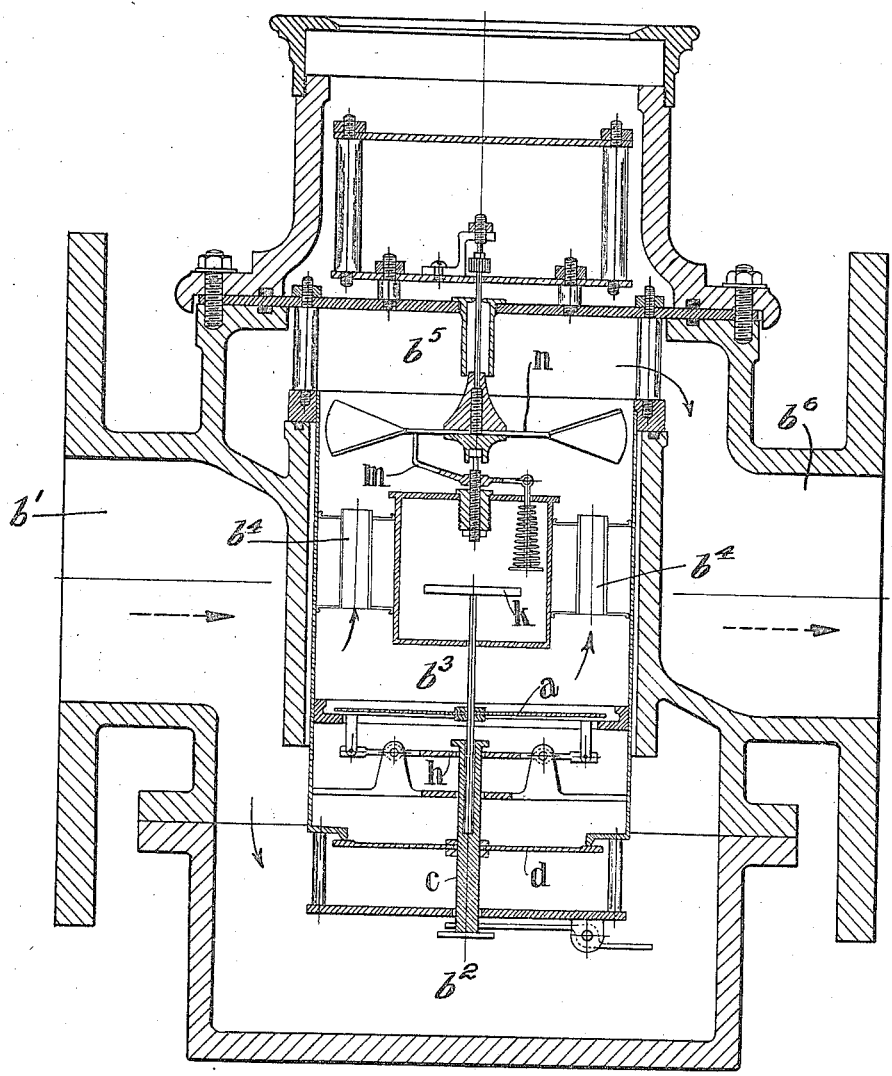

Instead of employing an equilibrium valve as aforesaid, we may employ a single valve $d$ connected to the disc $a$ as shown in the examples illustrated at Figures 2 and 4. In each of such examples, the valve $d$ is connected to the disc $a$ by means of a lever or levers $h$ and the valve $d$ tends to close under the pressure of the gas in the gas main at the inlet side of the meter.

In the constructions shown in Figures 2 and 4 the gas enters through an inlet $b'$, and when the disk $a$ and valve $d$ are opened, the gas passes upwardly from the chamber $b^2$ into the chamber $b^3$. From the latter chamber the gas flows through tubes $b^4$ which directs the same onto the vanes of the rotor $n$. After leaving the rotor the gas passes into a chamber $b^5$ and from this chamber is discharged through the outlet $b^6$.

If the valve $d$ be adapted to open with the pressure of the gas, instead of against it as in the Figures 2 and 4 examples, we may employ a double arched spring such as is illustrated at $i$ in Figure 5 so that resistance is offered to the initial movement of the valve. With this arrangement, the risk of opening of the valve, due to the ordinary gas mains pressure, is minimized, whilst we do not cause the imposition of a considerable back pressure upon the gas when the valve is open, such as would be the case if the valve were loaded with an ordinary spring or weight.

In the Figure 5 arrangement, the disc $a$ also forms the meter control valve and is combined with the spring arrangement aforesaid to prevent opening of the valve under the gas mains pressure.

In the embodiment illustrated in Figure 5, the fluid enters through an inlet $c'$ and flows downwardly into a chamber $c^2$, and when the valve $a$ is opened, the fluid passes upwardly through the tubes $c^3$ which directs the same onto the vanes of the fan wheel. The fan wheel is not shown in this figure. The fluid passes outwardly through an outlet $c^4$.

We may, if desired, connect a plate-like part $k$ with the disc $a$ aforesaid (as shown in Figures 2, 4 and 5) which serves when the control valve is opened, to release a brake $m$ which is employed to prevent over-running of the rotor $n$ of the meter, and when the control valve is closed, to allow of the said brake engaging the rotor; in the Figure 1 arrangement, the brake $m$ itself is directly connected to the disck $a$. The rotor $n$ indicated diagrammatically in the drawings is of the well known fan type employed in rotary meters and operates in the usual manner therein.

In all cases, the control valve $d$ (or $a$, Fig. 5) is opened when it is desired to pass gas therethrough by trigger or like mechanism on the exterior of the meter, or by mechanism within the meter itself, but we do not limit ourselves to any particular mechanism for this purpose. The opening of the said valve raises the disc which is then supported by the gas flowing past it unless the rate of flow is less than the predetermined minimum when the disc will fall and the valve will close.

Figure 6:
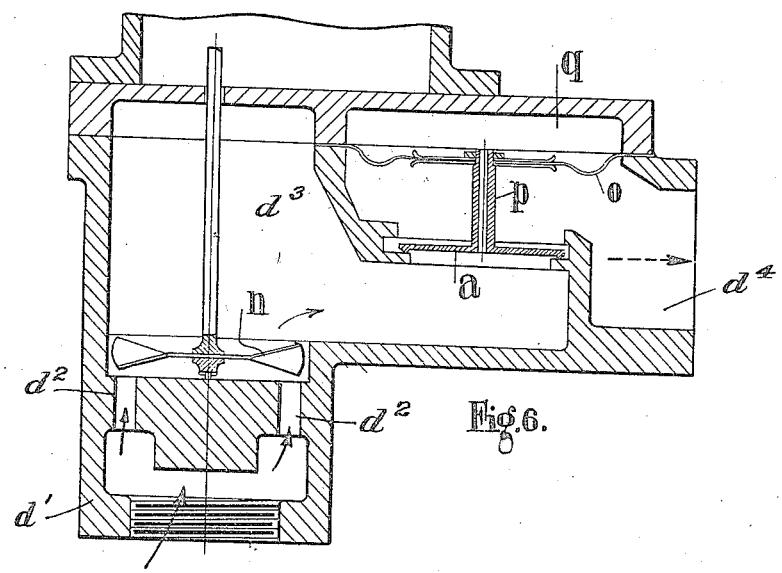

In some cases, as in Figure 6, we may cause the disc $a$ aforesaid which is acted upon by the gas flowing there-past, to itself form the control valve and to be connected to a diaphragm $o$ by a hollow stem $p$ so that the gas from the meter gains access to the outer side $q$ of the diaphragm which is of larger area than the disc $a$ and so holds the latter closed. When, however, the disc $a$ has been raised, the pressure at the inner side of the diaphragm counteracts the pressure at the opposite sides ($q$) and the velocity of flow of the gas holds the disc $a$ raised unless the said velocity falls below the predetermined minimum, when the disc falls and the pressure on the outer side of the diaphragm holds the disc closed upon its seat. The valve $a$ is opened by externally operated means (not shown) as in the previous arrangement.

In the modification illustrated in Figure 6, the fluid enters the casing through an inlet $d'$ and then flows through the tubes $d^2$ onto the vanes of the rotor $n$ and into a chamber $d^3$. When the valve $a$ is open, the fluid passes through the opening normally closed by the valve and passes out of the casing through an outlet $b^4$.

We may vary the details of the mechanism before described, to suit any particular requirements.

Having now described our invention what we claim as new and desire to secure by Letters Patent is:—

1. In gas and like meters of the type described, the combination with a rotor forming part of the measuring mechanism, of means for automatically cutting off the flow of fluid to the rotor when the rate of flow falls below a predetermined minimum, consisting in part of an element which is sustained by the fluid flowing past the element and to the rotor when the rate of flow is equal to or above the said minimum, a support onto which said element descends when the rate of flow falls below the said minimum, and means having a control element on the exterior of the meter for raising the element from said support to permit the resumption of flow of the fluid.

2. In gas and like meters of the type described, the combination with the rotor forming part of the measuring mechanism, of an element which is sustained by the flow of fluid to the rotor when the rate of flow is equal to or above a predetermined minimum, a support on to which the said element seats when the rate of flow falls below the said minimum a valve movable with said element for cutting off the supply of fluid on the seating of the said element, and means operating independent of the fluid pressure for opening said valve.

3. In gas and like meters of the type described, the combination with the rotor forming part of the measuring mechanism of an element which is sustained by the flow of fluid to the rotor when the rate of flow is equal to or above a predetermined minimum, a support on to which the said element seats when the rate of flow falls below the said minimum, a valve movable with said element for cutting off the supply of fluid on the seating of the said element, means imposing resistance to the opening of the said valve, and means operating independently of the fluid pressure for opening said valve.

4. In gas and like meters of the type described, the combination with the rotor forming part of the measuring mechanism, of an element which is sustained by the flow of fluid to the rotor when the rate of flow is equal to or above a predetermined minimum, a support on to which the said element descends when the rate of flow falls below the said minimum, a control valve connected with the said element, and means for effecting an initial opening of the said valve, as set forth.

5. In gas and like meters of the type described, the combination with the rotor forming part of the measuring mechanism, of an element which is sustained by the flow of fluid to the rotor when the rate of flow is equal to or above a predetermined minimum, and a control valve and a rotor brake, both of which are connected to the said element, as set forth.

In testimony whereof we have signed our names to this specification.

FRANKLIN THORP.
HARVEY THOMAS THORP.

Witnesses:
ARTHUR HUGHES,
HILDA HUGHES.